Patented Oct. 27, 1931

1,828,754

UNITED STATES PATENT OFFICE

WILLIAM TORANCE, OF CALGARY, ALBERTA, CANADA

GRAIN STOOKING MACHINE

Application filed May 17, 1929. Serial No. 363,822.

My invention relates to stooking machines and is attached to a binder, and has for its object the receiving of the sheaves as they come from the binder, forming them into stooks and setting the stooks in rows.

I more particularly describe my invention by the illustrations in the accompanying drawings, in which:—

Figure 5 is a detail of the crank mechanism, pivot bar and sub-frame used in connection with operation of the basket.

Similar figures refer to similar parts throughout the various views.

Figure 1:
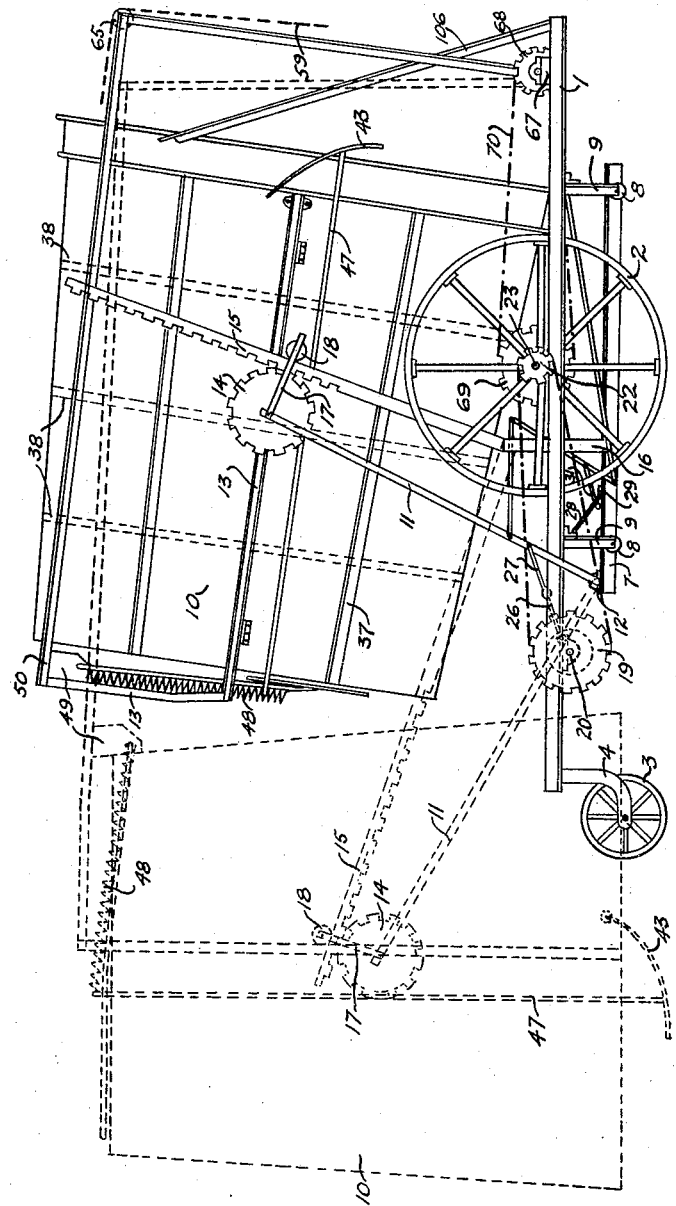
Figure 1 is a side view of the machine showing in dotted lines the position of the basket when unloading.
Figure 2:
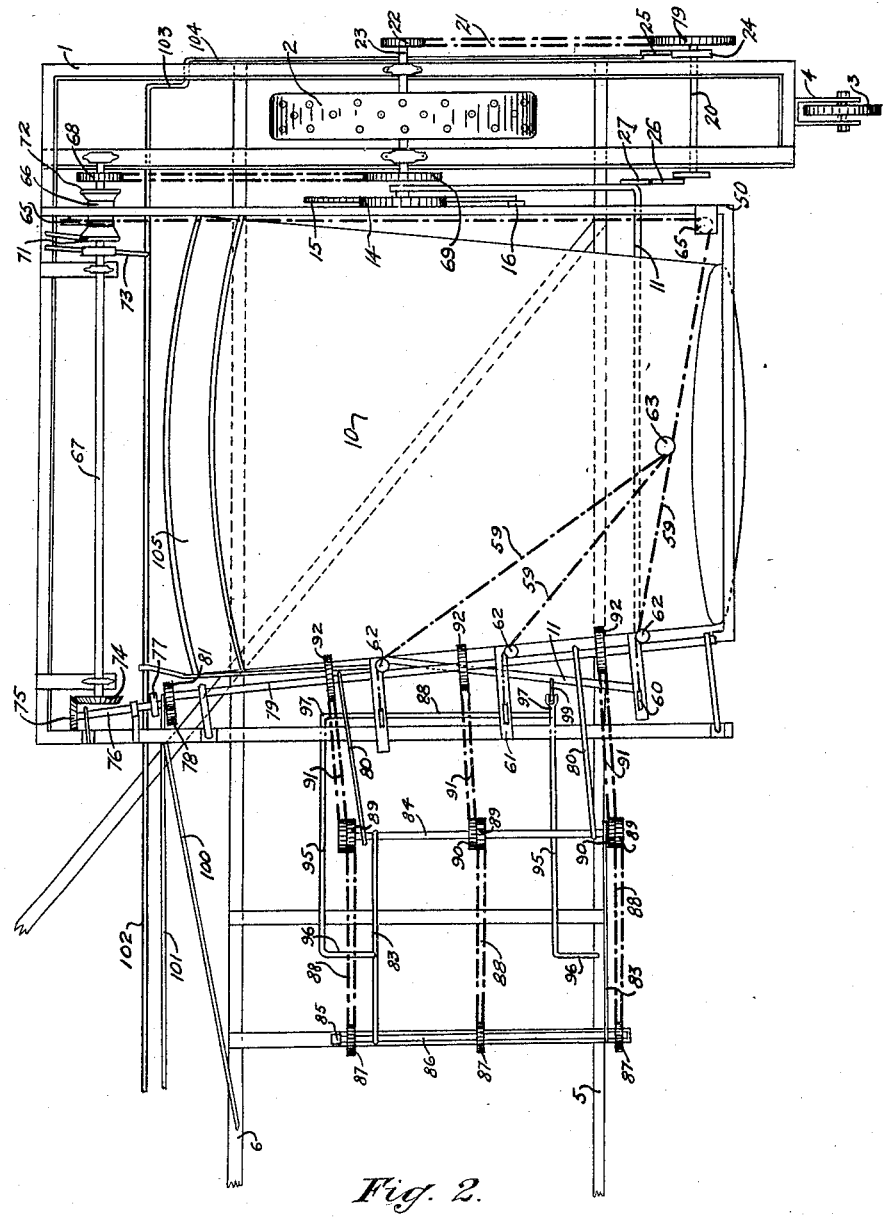
Figure 2 is a plan view of the machine.
Figure 3:
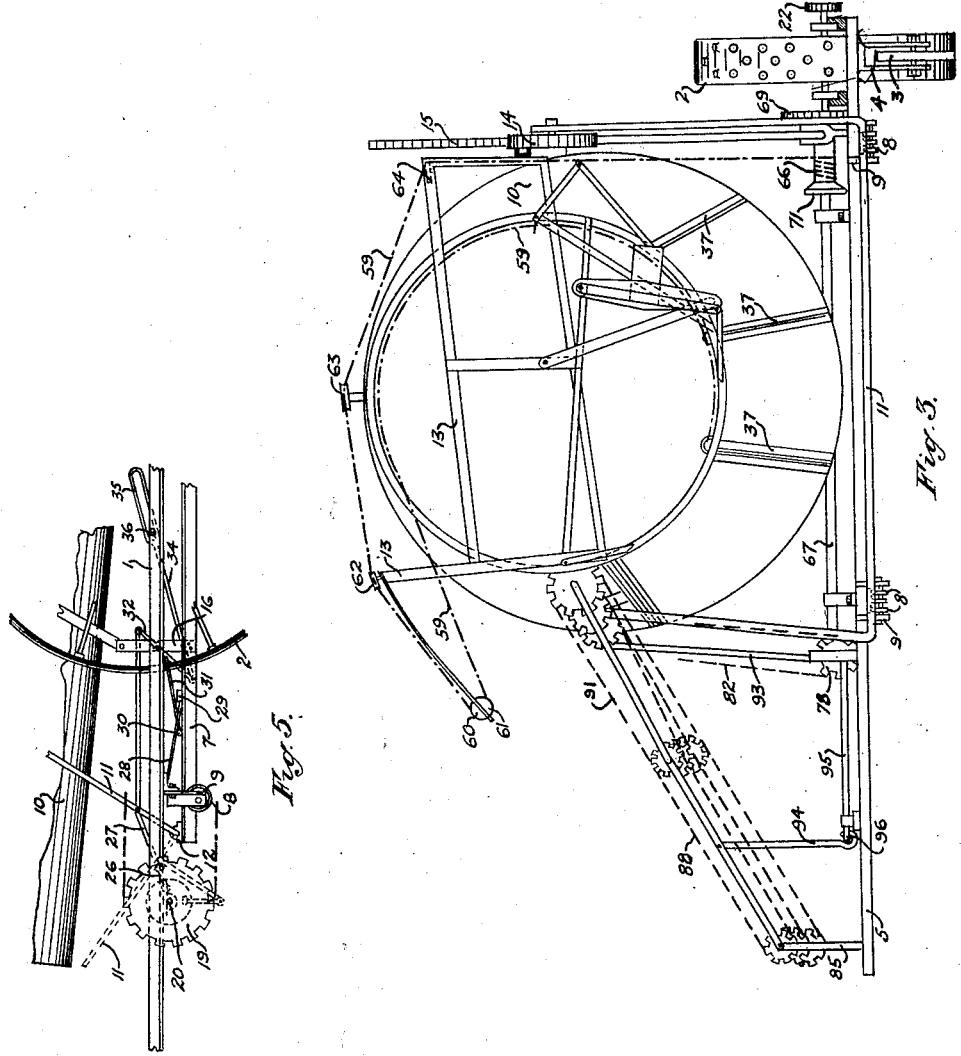
Figure 3 is a rear view of the machine.
Figure 4:
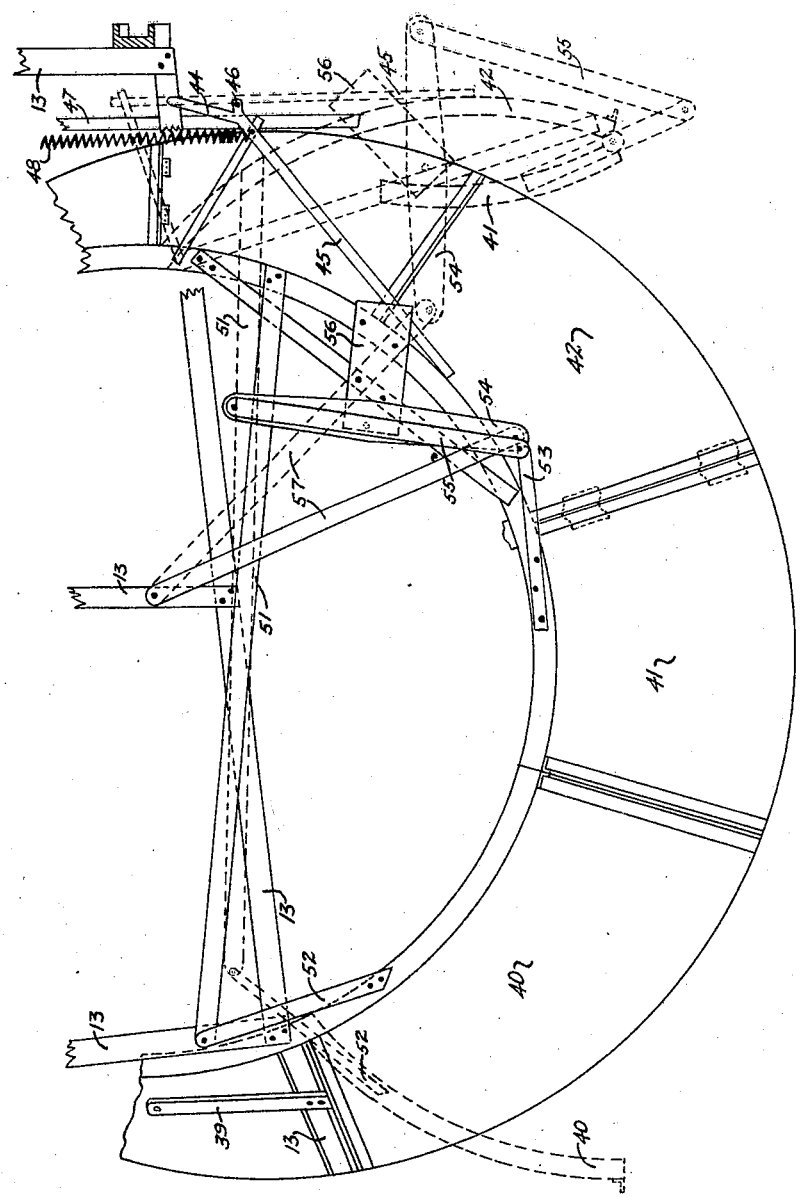
Figure 4 is a part view of the basket showing the device for opening the doors.

1 is the main frame of the machine composed of several parts, suitably braced, to support the machine. 2 is the driving wheel which is suitably journalled on the main frame 1. A castor wheel 3 is attached through its arms 4 to the end of the main frame 1. The opposite side of the main frame is attached by two arms 5 and 6 to the binder. A sub-frame 7 is supported by rollers 8 which are attached to the main frame by brackets 9.

Supported on the sub-frame 7 is the basket 10 by means of a U-shaped pivoted bar 11, which is pivoted in bearings 12 attached to ends of sub-frame. The outer ends of the U-shaped bar 11 are pivoted on either side to the basket frame 13. Affixed to one side of the basket frame is a cog wheel 14 which operates on the pivot connecting U-shaped bar 11 to the basket frame. The cog wheel 14 engages with a rack 15 which is pivoted at its lower end to the sub-frame 7 by a bracket 16, and is guided in its movement by means of bracket 17 supporting a guide wheel 18 which runs on the back of the rack 15.

A sprocket wheel 19 is journalled on a shaft 20 which is attached by bearings to main frame, and is driven by means of a chain drive 21 engaging with sprocket gear 22 which is affixed to shaft 23 of driving wheel 2. A clutch 24 is affixed to shaft 20 and engages with sprocket wheel 19 when trip arm 25 is operated, and this turns shaft 20 one complete revolution when the clutch automatically becomes disengaged. A crank arm 26 is affixed to end of shaft 20 and is connected to pivot bar 11 by means of a connecting link 27.

The basket 10 is in its normal position for receiving sheaves from the binder as shown in Figure 1 in full lines, and is operated and swung into position for setting up the stook as shown in dotted lines, by the mechanism as above described.

As shaft 20 revolves, the pivot bar 11 is swung in an arc, carrying basket 10 with it. the basket being turned to an upright position by means of the movement of the cog wheel 14 on the rack 15, and in this position the stook is deposited on the ground.

A trip arm 28 attached to main frame 1 engages with a block 29 attached to sub-frame 7. This trip arm is tripped by means of a roller 30 attached to end of bar 31 which is pivoted on arm 32. The arm 32 is pivoted on bracket 16 and is operated through rod 33 to which it is attached at one end, the said rod 33 being pivoted to rod 11. The lower end of arm 32 is pivoted to one end of rod 34, while the other end of rod 34, which has a slot 35, slides on a pin 36 attached to main frame 1, thus allowing a free movement of arm 32 without any undue movement of the main frame.

In the movement of the basket to its upright position, in which position the stook is placed on the ground, the arm 32 is drawn back, thus operating the roller 30. The length of the bar 31 is figured so as to allow the roller 30 to release trip arm 28 as basket reaches its unloading position, thus allowing the basket and sub-frame to remain in their relative positions while a slight forward movement takes place in the main frame before the basket starts back to its normal loading position which allows time for the doors to open.

The crank arm 26 makes one complete and continuous revolution during the operation of the basket, and when it is at its lowest position, as shown by dotted lines in Figure 1, the basket is in the unloading position, and on the completion of the revolution of the crank arm, the basket is brought back to its loading position and the sub-frame 7 is returned to its forward or normal position by the release of the roller 30 through the movement of arm 32, thus allowing trip arm 28 to fall back and engage with block 29.

The basket 10 has tapered sides and is open at both ends, having a number of ribs 37 running longitudinally on the outside, and ribs 38 inside, with broken joints where they meet the doors, encircling the circumference. The basket is supported by the frame 13 which has a small bracket 39 attached to the side on which the conveyor operates, the end of said bracket being attached to pivot bar 11. This connection is so placed as to give more clearance to the conveyor.

On one side of the basket are three doors 40, 41 and 42. Doors 40 and 42 are hinged to basket frame 13 while door 41 is hinged to door 42. Doors 40 and 42 are swung outwards, while door 41 which is hinged to door 42 swings inward.

The doors 40 and 41 are opened by a combination of levers which work automatically when the basket reaches its unloading position, and close again when the basket resumes its normal position for loading.

When the basket has reached its unloading position, a shoe 43, by striking the ground, operates trip 44 which is pivoted at one end of frame 13, the other end being connected to bracket arm 45 which is attached to top of door 42. A lug 46 is fastened to trip 44 through which it is connected by rod 47 to shoe 43. The door 42 is opened by the spring 48 which is attached at one end to bracket arm 45, the other end of which is connected to bracket plate 49 which is attached to part of the cable frame 50. The door 40 is connected to door 42 by rod 51 through a short arm connection 52 to which it is pivoted.

Door 41 is opened through lever arrangement consisting of arm 53 attached to the door, the said arm 53 being pivoted to the lever arm 54 through rod connection 55. The centre of lever arm 54 is pivoted to door 42 by means of a plate 56. The other end of lever arm 54 is pivoted to rod 57 which forms connection to frame 13.

A cable frame is pivoted to basket frame 13 near its top and is composed of two members 50 and 58 which are pivoted at right angles to one another, the member 58 being pivoted to main frame 1 of the machine.

A series of cables 59 attached at one end to the free side of door 41 runs around a portion of the inner circumference of the basket 10 and on to pulley 60 attached to gate 61 which is pivoted to basket frame 13. This gate closes an opening left in the side of the basket 10 through which the sheaves are fed into the basket, and is closed by the tension of the cables 59 as they are tightened. From pulley 60 the cables pass on over pulley 62 which is attached near the pivot point of gate 61, and continues on over pulley 63 which is attached to the side of the basket, and then on to pulley 64 attached to cable frame 50 near the point where said cable frame is pivoted to basket frame 13, and continues along cable frame to pulley 65 which is pivoted at the joint of the two members of the cable frame 50 and 58, from whence it passes on and is fastened to drum 66.

The cables 59 are adjustable for position on door 41 and gate 61, and also adjustable for length in relation to one another, according to length of grain being stooked and the taper of the stook, thus if a wider base is required for the stook, the upper cables are drawn tighter than the lower ones.

The drum 66 is journalled on drum shaft 67, the said drum shaft being journalled in brackets attached to main frame 1, and is driven by a sprocket 68 attached to one end of same, said sprocket 68 being connected to sprocket 69 which is attached to main shaft 23 of drive wheel 2, and driven by chain drive 70. On either side of drum 66 are cone shaped clutches 71 and 72. The said clutches are keyed to shaft 67, with clutch 71 being free to move along the shaft by means of lever arrangement 73. On the far end of shaft 67 is a bevel gear 74 which engages the bevel gear 75 attached to cross shaft 76, said cross shaft being journalled on brackets attached to main frame 1.

A clutch 77 is mounted on shaft 76 which drives sprocket 78 mounted loosely on shaft 76. The conveyor shaft 79 which is mounted on part of conveyor frame 80 is driven by means of a sprocket 81 through chain drive 82 engaging with sprocket 78. A conveyor consisting of two sections of frame 80 and 83 which are joined and pivoted about the centre by shaft 84. The lower end of the conveyor is supported by brackets 85 fastened to main frame. A shaft 86 is mounted on lower end of conveyor frame and has loosely attached thereto a number of sprockets 87 which are engaged through chain drive 88 to sprockets 89 which are loosely mounted on shaft 84. Sprockets 90 are attached to sprockets 89 and are driven through chain drive 91 by means of sprockets 92 which are attached to conveyor drive shaft 79, said sprockets 92 varying in size sufficiently to turn sheaves parallel to side of basket 10 as they reach that point. The top end of conveyor is supported by arms 93 running from drive shaft 79 of conveyor to a point 94 in line with drive shaft 76, and are of sufficient length to allow of the conveyor feeding into basket.

The centre of conveyor is supported by bars 94 which are attached to shafts 95 having short arms 96 and 97 at either end and at about right angles to one another. Shafts 95 are supported by brackets from frame 1 and are connected together at pivot point of arm 97 by a bar 98 which is connected to U-shaped bar 11 by bar 99 in such a manner as to allow conveyor to drop during the first part of travel of the pivot bar 11, and the conveyor is raised through the latter part of the travel of said pivot bar 11.

When the basket is in the filling position, the discharge end of the conveyor is placed into the opening of the basket by the action of the mechanism above described, and when the basket is beginning its movement to its discharge position, the conveyor is withdrawn and brought to its folding position. The whole operation is performed automatically.

Rod 100 runs to clutch 77 which drives sprocket 78 and is connected to binding mechanism of binder, thus turning sprocket 78 one revolution as each sheaf is bound and thus moving conveyor a certain distance. Rods 101 and 102 are connected to a foot pedal or lever near driver's seat, in such a manner that the clutches 77 and 71 are engaged by one movement of said foot pedal or lever, and causing continuous travel of conveyor while clutches are so engaged. The cables 59 are tightened during this operation by clutches 71 and 72 engaging and driving cable drum 66, thus forming the stook and holding it in the basket while being set and automatically adjusting itself to varying numbers of sheaves in different stooks.

When the foot pedal or lever is moved in opposite direction to that described above, clutches 77 and 71 are disengaged and clutch 24 is engaged by means of L-shaped lever 103 which is pivoted to rods 102 and 104 and also pivoted at its centre to the main frame 1, the said rod 104 being connected to trip 25 of clutch 24, and through this action, basket is brought to its discharging position and then returned to the loading position.

A bottom 105 having sides of a certain depth, is fastened to main frame 1 in such a position that it serves as a bottom to the basket 10 when in the loading position, to form the base of the stook as it is being built up in the basket, and is braced and held in position by braces 106 attached to main frame 1. The sides of the bottom are to allow of the stook being formed below the bottom of the basket, so that when stook is set upon ground, the basket remains clear.

What I claim is:

1. In a stooker, a tiltable member for forming the stook and depositing it and having a sheaf entrance and closure therefor and a sling member gathering the sheaves in its loop and drawing the closure to its shut position on the completion of the stook.

2. In a stooker, a tiltable basket having a frame formed with doors in the side thereof and slings for closing said doors and for gathering the sheaves in their loops and means for tilting the basket on the completion of the formation of the stook.

3. In a stooker, a tiltable basket having swinging and folding doors in the side wall, cables forming loops for gathering the sheaves within the basket, conveying means for delivering the sheaves to the loops having a gate closure operatively connected to said cables and means for stopping and starting said conveying means.

4. In a stooker, a main frame and running gear, a sub-frame having a limited movement, a stook basket having a pivotal yoke support from said sub-frame, means engaging said yoke for inverting and returning said basket and articulated rod gear connecting said main frame and said yoke through said sub-frame and insuring the self-adjustability of the parts during the temporary pause in depositing the stook.

5. In a stooker, a main frame and running gear, a sub-frame having a limited movement, a stook basket having a pivotal yoke support from said sub-frame, means engaging said yoke for inverting and returning said basket and articulated rod gear having an anchoring slotted rod forming a slip joint to the main frame, a rocker arm secured to the sub-frame and a connecting rod secured to the yoke.

6. In a stooker, a main frame and running gear, a sub-frame having a limited movement, a stook basket having a pivotal yoke support from said sub-frame, means engaging said yoke for inverting and returning said basket, and articulated rod gear having a connecting rod to the yoke, an anchoring slotted rod to the main frame an intermediate rocker arm pivoted to the sub-frame and a trip rod from the rocker arm engaging a stop rod from the main frame abutting a stop lug from the sub-frame and liftable therefrom.

7. In a stooker, a main frame and running gear, a sub-frame suspended from the main frame by hangers forming bearings for rollers, a stock basket having a pivotal yoke support from said sub-frame, means engaging said yoke for inverting and returning said basket and articulated rod gear connecting said main frame and said yoke through said sub-frame and insuring the self-adjustability of the parts during the temporary pause in depositing the stook.

8. In a stooker, a main frame and running gear, a sub-frame having a limited movement, a stook basket having a pivotal yoke support from said sub-frame, a toothed rack pivotally supported from said sub-frame, an operating gear wheel journalled from the end of said yoke and coacting with said rack and geared thereto, a crank mechanism operated from the running gear and operatively connected to said yoke, and articulated rod gear connecting said main frame and said yoke through said sub-frame.

9. In a stooker, a main frame and running gear, a dish shaped basket bottom standing upright towards one end of said frame, a stook basket pivotally supported and having a sheaf entrance and closures and fitting to said bottom in its leading position, a conveyer leading to said entrance and having a barrier at the end thereof and means for inverting said basket away from said bottom and coincidently closing the barrier and closures and for returning it to said bottom and opening the closures and barriers and restarting the loading.

10. In a stooker, a tiltable basket having a sheaf entrance and a plurality of folding hinged doors secured to the basket and to one another, articulated levers connected with said doors for opening and closing the same, a shoe secured to said basket and adapted to operate said levers on contact with the ground, a hinged gate closing a conveyer passage to a wall opening, looped cables receiving the sheaves and operatively connected to said doors, a main frame and a sub-frame supporting said basket and self adjustable in respect to the main frame.

11. In a stooker, a tiltable basket having a feed opening in the side wall and discharge openings, a gate closing the way to the feed opening, looped cables receiving the sheaves and operatively connected with said gate, means for operating said doors automatically on the deposit of the stook, a conveyer removable from the feed opening on the completion of the stook, a main frame and a sub-frame supporting said basket and self adjustable in respect to the main frame.

12. In a stooker, a tiltable basket having a frame, a main frame, a sub-frame supporting said basket and self adjustable in respect to the main frame, and looped cables receiving the sheaves, a cable frame having one section pivoted to the main frame and the other section pivoted to the basket frame, and pulleys secured to said frame and to the basket frame and extending said cables into said basket and into operating relationship with closures.

13. In a stooker, a tiltable stook basket, a main frame, a sub-frame supporting said basket and self adjustable in respect to the main frame, a conveyer in pivotally joined sections, means for raising and lowering the inner one of said sections, means for gathering the bundles to form the stook, a main driving shaft, clutches operatively connecting the driving mechanism, and operating rods connected to a pedal for bringing the aforesaid means coincidently into and out of action.

14. In a stooker, a conveying mechanism, a basket and bundle, gathering means therein, a main shaft and operating mechanism a main frame having longitudinal and transverse girders and struts extending upwardly therefrom, a sub-frame supporting said basket and self adjustable in respect to the main frame, a tiltable frame carrying said basket on said sub-frame, a pivoted conveyer for said bundle gathering means operating with said tiltable frame, and means for actuating said operating mechanism at a single movement either way for moving the parts coincidently in the carrying out of their functions.

WILLIAM TORANCE.